United States Patent [19]

Hector et al.

[11] 4,178,416

[45] Dec. 11, 1979

[54] ACICULAR FERRIC OXIDE FOR MAGNETIC RECORDING AND PROCESS FOR PRODUCING SAME

[75] Inventors: Jean-Marie H. Hector, Ozoir-La-Ferriere; Bernard J. Pingaud, Vincennes, both of France

[73] Assignee: Eastman Kodak Company, Rochester, N.Y.

[21] Appl. No.: 959,135

[22] Filed: Nov. 9, 1978

Related U.S. Application Data

[63] Continuation of Ser. No. 775,146, Mar. 7, 1977, abandoned.

[30] Foreign Application Priority Data

Mar. 12, 1976 [FR] France ............................. 76 07074

[51] Int. Cl.$^2$ ............................................. C01G 49/06
[52] U.S. Cl. ................................... 428/539; 252/62.56; 252/62.62; 428/900
[58] Field of Search ....................... 427/127; 423/634; 252/62.56, 62.62; 428/539, 900

[56] References Cited

U.S. PATENT DOCUMENTS

| | | | |
|---|---|---|---|
| 3,720,618 | 3/1973 | Toda et al. ........................ | 252/62.56 |
| 3,843,773 | 10/1974 | Pingaud ............................. | 423/634 |
| 3,912,646 | 10/1975 | Leitner et al. .................... | 252/62.56 |
| 4,010,310 | 3/1977 | Kubota et al. ................... | 427/127 X |

*Primary Examiner*—Jack Cooper
*Attorney, Agent, or Firm*—Bernard D. Wiese

[57] ABSTRACT

Cobalt doped, acicular, gamma ferric oxide which exhibits reduced print-through without substantial loss in signal output or recording sensitivity is disclosed. This cobalt doped, acicular, gamma ferric oxide is prepared in the presence of a water soluble, acyclic dicarboxylic acid or its precursor which alters or modifies the usual distribution of the cobalt doping ions in the crystal lattice. The dicarboxylic acid directs the distribution of the cobalt doping ions into the crystal lattice in such a way that the crystals obtained by the process disclosed exhibit an increase of at least 5% in the ratios between the intensities of each of the triplet lines 110, 210 and 211 with respect to the 111 line, as shown upon examination by X-ray diffraction analysis. Typical dicarboxylic acids disclosed are oxalic acid, malonic acid, succinic acid, glutaric acid and maleic acid. Magnetic recording products such as tapes, discs and the like, containing the improved cobalt doped, acicular, gamma ferric oxide are also disclosed.

12 Claims, 4 Drawing Figures

ACICULAR FERRIC OXIDE FOR MAGNETIC RECORDING AND PROCESS FOR PRODUCING SAME

This is a continuation of application Ser. No. 775,146, filed Mar. 7, 1977, now abandoned.

BACKGROUND OF THE INVENTION

This invention relates to magnetic recording. In one aspect, this invention relates to an acicular, gamma ferric oxide which is doped with cobalt and is suitable for use in preparing magnetic recording materials, particularly high performance magnetic tapes exhibiting reduced print-through. In another aspect, this invention relates to a process for obtaining such an oxide and magnetic recording elements containing these oxides.

In the field of signal recording, it is obviously desirable to be able to prepare high performance magnetic recording elements, for example, magnetic tapes. It is also known that the capabilities of magnetic recording elements such as tapes, discs, drums, striped motion picture films and the like which are used for recording and reproduction of sounds, images and other signals are closely related to the properties of the magnetizable materials employed in these elements.

One of the more commonly used magnetizable particles for magnetic recording elements is acicular gamma ferric oxide having a particle length which is less than about 1.5 microns. Such acicular gamma ferric oxide can be obtained from ferric oxide hydrate which is then dehydrated to form alpha ferric oxide which is then reduced to form ferrous ferric oxide which in turn is oxidized to gamma ferric oxide.

DESCRIPTION OF THE PRIOR ART

It is known that the magnetic properties of acicular gamma ferric oxide can be improved by doping this oxide with suitable dopant metal ions such as cobalt ions. Doping involves introducing dopant metal ions such as cobalt ions into the crystal of the oxide.

It is also known that cobalt doped, acicular gamma ferric oxide can be prepared by adding an aqueous solution of a ferrous salt such as a sulfate or chloride to an alkaline hydroxide such as sodium hydroxide or potassium hydroxide in the presence of cobalt doping ions and optionally other doping metal ions, to form a ferrous hydroxide precipitate in the form of a dispersion, passing oxygen through the dispersion at a suitable temperature, for example, below 60° C., to convert ferrous hydroxide particles to alpha ferric oxide hydrate crystals, discontinuing introduction of oxygen, boiling the dispersion to perfect crystallization of the alpha ferric oxide hydrate crystals, dehydrating the alpha ferric oxide hydrate crystals to form alpha ferric oxide, reducing the alpha ferric oxide to form ferrous ferric oxide crystals and oxidizing these crystals to form gamma ferric oxide. Suitable process steps, reaction conditions, reactant concentrations and several variations in this process have been described in our French Pat. No. 2,129,841, published Nov. 3, 1972. The process of this invention represents an improvement over such prior art processes in that a water soluble, acyclic dicarboxylic acid or its precursor is added to the reaction prior to oxidation of the ferrous hydroxide particles to form alpha ferric oxide hydrate crystals.

Japanese Application No. 47-40758, published Oct. 14, 1972, in the name of Hitachi Maxell Ltd., describes a process for preparing gamma ferric oxide crystals using hydroxycarboxylic acids such as citric, tartaric or malic acids during the process. The purpose of this process is to prepare gamma ferric oxide crystals that are not acicular. Thus, the Japanese application states that the crystal morphology of the gamma ferric oxide is modified and the oxide becomes oval in shape (rice-grain shaped). In contrast, our process as described hereinafter, is used for the purpose of preparing acicular gamma ferric oxide crystals having improved properties and differs from the process of the Japanese application in several significant respects. For example, in the process of the Japanese application ferrous hydroxide is prepared by adding an insufficient amount for complete reaction, of an aqueous alkaline solution such as aqueous sodium hydroxide to a ferrous salt solution, i.e. less than 0.75 mol equivalent of the aqueous alkaline solution is used in the reaction. In contrast, our process employs the aqueous alkaline solution in stoichiometric excess and the ferrous salt solution is added to the aqueous alkaline solution while local excesses of ferrous salt are substantially avoided. Also, non-hydroxy substituted dicarboxylic acids such as succinic acid can be employed in the practice of our process and there is no suggestion in the Japanese application of using such acids. It is significant to note that the results obtained by the process of the Japanese application and our process are quite different. Thus, as previously indicated, in our process cobalt doped, acicular gamma ferric oxide drystals are obtained, while in the process of the Japanese application the size and shape of the gamma ferric oxide crystals are deliberately modified to obtain oval or rice-grain shaped crystals that are not acicular. In our process the size and shape of the gamma ferric oxide crystals is determined by the conditions of precipitation of the ferrous hydroxide formed early in the process. The addition of the water soluble acyclic dicarboxylic acid according to our process does not change this size and shape.

It is also known that magnetic recording elements such as magnetic tapes, exhibit a known unwanted layer-to-layer signal transfer or echo effect which is commonly referred to as print-through. Print-through occurs when such tapes are wound in contiguous convolutions such as when they are in the form of spools or cartridges. In this situation the signal recorded on a convolution is transferred by induction to the adjacent convolution which produces on the latter an undesirable noise which, of course, it is desirable to avoid.

OBJECTIVES OF THE INVENTION

One object of this invention is to provide a cobalt doped, acicular gamma ferric oxide exhibiting substantially reduced sensitivity to print-through when it is employed in the preparation of magnetic recording elements such as magnetic tapes. In practicing this invention, it is possible to obtain such an improved oxide without any substantial or significant loss in signal output or in recording sensitivity which often results with processes of the prior art intended to reduce print-through.

Another object of this invention is to provide a process for the preparation of cobalt doped, acicular gamma ferric oxide crystals, which in the form of magnetic recording elements such as tapes, exhibit a significant reduction in sensitivity to print-through without any substantial loss in signal output or in recording sensitivity. Still another object of this invention is to provide magnetic recording elements, for example, magnetic tapes for audio or video recording which contain such cobalt doped, acicular gamma ferric oxide crystals.

SUMMARY OF THE INVENTION

In accordance with this invention, it has been found that a water soluble, acyclic dicarboxylic acid or its precursor can be used to alter or change the distribution of doping metal ions such as cobalt doped, acicular gamma ferric oxide crystals. The resulting cobalt doped, acicular gamma ferric oxide crystals exhibit improved print-through without substantial loss in signal output and have a distribution of doping metal ions in their crystal lattices which (1) has been directed by a water soluble, acyclic, dicarboxylic acid and which (2) increases, by at least 5 percent, the ratios between each of the intensities of the triplet lines 110, 210 and 211 with respect to the 111 line, as determined by X-ray diffraction. This positioning of the cobalt ions in sites where they are substituted for iron ions reduces their degrees of freedom in the doped gamma ferric oxide crystal structure and this improves magnetic stability.

This invention also relates to a process for preparing cobalt doped, acicular, gamma ferric oxide crystals that exhibit improved print-through without substantial loss in signal output or in recording sensitivity. This process comprises:

(1) forming an aqueous dispersion of ferrous hydroxide particles by adding an aqueous solution of ferrous salt having a pH up to about 5.5 to an aqueous solution of a stoichiometric excess of an alkaline hydroxide in the presence of cobalt doping ions, while substantially avoiding local excesses of the ferrous salt, (2) introducing oxygen into the dispersion at a temperature below 60° C. for a period of time sufficient to convert the ferrous hydroxide particles to ferric oxide hydrate crystals and, (3) subjecting these crystals to dehydration, reduction and oxidation to form cobalt doped, acicular gamma ferric oxide, this process being characterized by the addition of about 0.5 to 20 percent, by weight, based on ferrous hydroxide, of a water soluble, acyclic dicarboxylic acid or its precursor prior to the introduction of the oxygen in step (2).

BRIEF DESCRIPTION OF THE DRAWINGS

The drawings represent X-Ray Diffraction Spectrograms of an acicular ferrous-ferric oxide (FIG. 1), acicular gamma ferric oxide (FIG. 2), acicular gamma ferric oxide doped with 3 percent, by weight, of cobalt (FIG. 3), and acicular gamma ferric oxide doped with 3 percent, by weight, of cobalt and prepared in the presence of a dicarboxylic acid (succinic acid), as described herein (FIG. 4). The spectrograms were made on powder samples using a Siemens counter diffractometer equipped with a scintillation counter and an X-ray monochromatic beam (Co Kα$_1$, radiation, wavelength 1.78896Å). The analyzing slit was 0.0664 Bragg degree, counter speed 8 minutes/Bragg degree, time constant 10 sec. and impulses/sec. was 100. The space angle examined was between 6 and 17 Bragg degrees and the diffraction lines examined had Miller indices of 110, 111, 210 and 211.

DESCRIPTION OF PREFERRED EMBODIMENTS

As previously indicated, the distribution of doping metal ions in the cobalt doped, acicular gamma ferric oxide crystals of this invention is directed, altered or modified by the addition of the water soluble, acyclic dicarboxylic acid or its precursor prior to oxidation of the ferrous hydroxide particles. It is known that in gamma ferric oxide crystals that are doped with cobalt, the cobalt ions are localized either in the vacancy sites or in the octahedric or tetrahedric sites of the cubic lattice where they are substituted for iron ions. Upon X-ray diffraction examination, as described herein, the distribution of cobalt in these two sites can be determined. Upon analysis, it can be seen that a relation exists between the distribution of the cobalt and the variation of the print-through. In general, it has been found that the print-through is decreased as the concentration of cobalt ions increases in substitution sites in the lattice in comparison to vacancy sites in the lattice of the ferrous oxide crystals of this invention. This is consistent with the increased magnetic stability obtained by placing some of the cobalt ions in the substitution sites in the crystal lattice.

Figure 1:
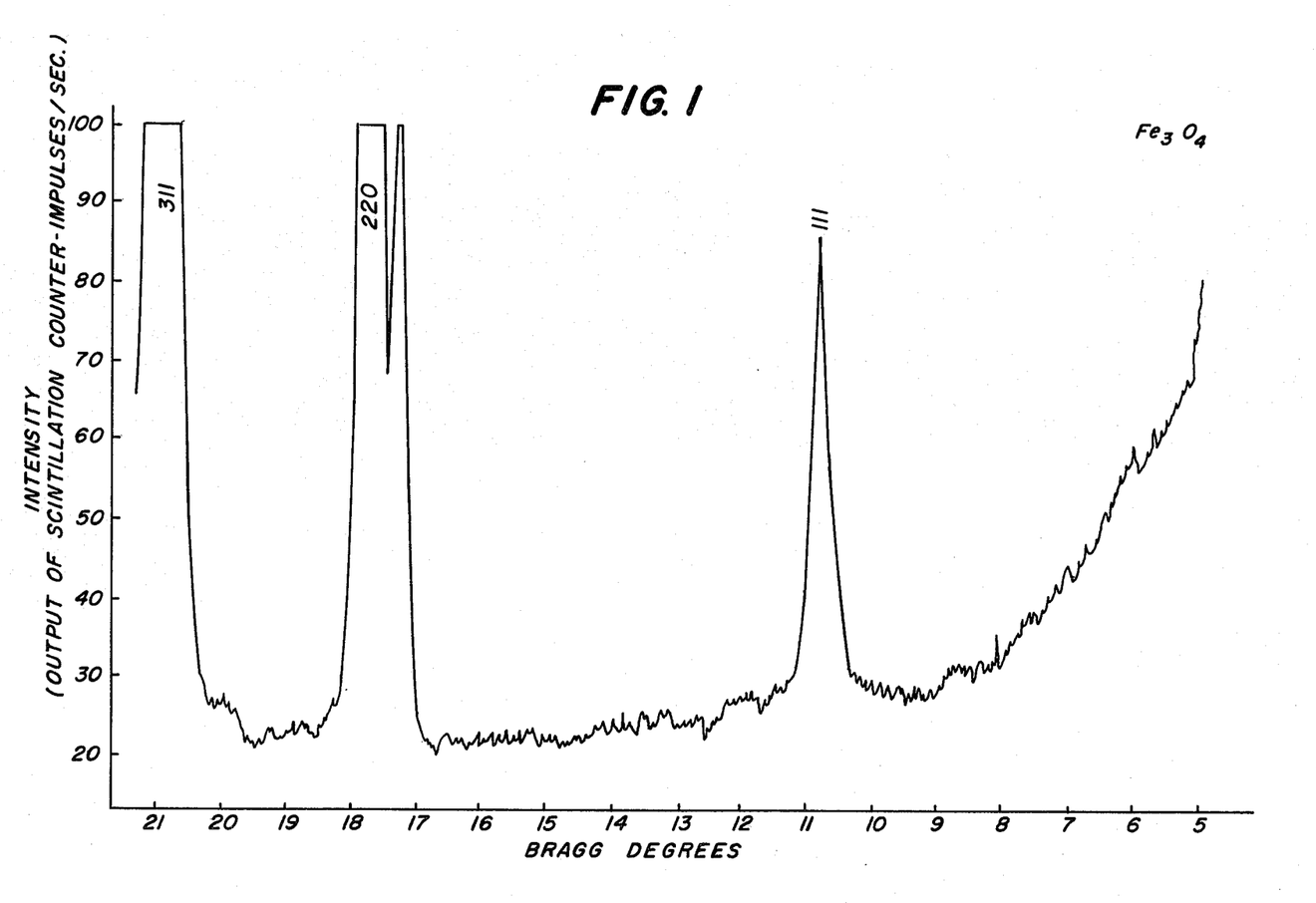

The cobalt doped, acicular gamma ferric oxide crystals of this invention exhibit an increase of at least 5 percent in the ratios between the intensities respectively, of the triplet lines 110, 210 and 211 with respect to the intensity of the line 111, upon X-ray diffraction analysis. This percentage increase is in relation to the corresponding cobalt doped, gamma ferric oxide which is prepared in the same manner but in the absence of water soluble, acyclic dicarboxylic acid or precursor. The 110, 111, 210 and 211 lines are selected for the measurement because the calculation of the theoretical X-ray diffraction spectrum shows that the intensities of the 110, 210 and 211 lines bear a direct relation to the number of cobalt ions in vacancies of the gamma ferric oxide crystal structure. As shown by FIG. 1 (acicular ferrous ferric oxide) where no vacancies exist in the inverse spinel crystal lattice, the 110, 210 and 211 lines have zero intensity. By comparing the relative intensities of the 110, 210 and 211 triplet with the 111 line for two samples, one prepared in the presence of water soluble, acyclic dicarboxylic acid or its precursor and one not, there is observed an increase in the ratio of the intensities in the gamma ferric oxide prepared in the presence of the acid or its precursor. This increase in the ratio is at least 5 percent, and generally is in the range of about 15 to 25 percent. It should be noted that the 111 line is a convenient reference since it is characteristic of the inverse spinel structure common to both ferrous ferric oxide and gamma ferric oxide.

The X-ray diffraction technique employed to determine the modification of the cobalt distribution in the acicular, gamma ferric oxide crystals of this invention is a known technique. The technique is described in several textbooks including "X-RAY DIFFRACTION PROCEDURES, For Polycrystalline and Amorphous Materials," 2nd Edition, by H. P. Klug and L. E. Alexander, John Wiley and Sons, New York, Copyright 1955 and 1974. The X-ray analysis is conveniently made on an acicular, gamma ferric oxide powder sample using a diffractometer equipped with a scintillation counter and an X-ray monochromatic beam (Co Kα$_1$ radiation with a wavelength of 1.78896 Å). The space angle analyzed is between 6 and 17 Bragg degrees and the measurements relate to the intensity of the diffraction lines having Miller indicies 110, 111, 210 and 211. A control sample prepared and doped under the same conditions as the sample under study, but without the addition of the dicarboxylic acid or its precursor during its synthesis, is used for comparison. Two X-ray analyses are made. One is made on a sample of acicular gamma ferric oxide doped with, for example, 3 percent, by weight, of cobalt, and prepared in the presence of a water soluble acyclic dicarboxylic acid. A corresponding sample prepared in the absence of the acid is also subjected to the X-ray analysis. Then the ratios between each of the intensities of the triplet lines 110, 210 and 211 with respect to the intensity of the 111 line are determined. It is found that these ratios are higher with the acicular gamma ferric oxide crystals that are prepared with the acid in comparison to the crystals that are not so prepared. This is shown by an examination of the spectrograms (FIGS. 3 and 4) and the table in Example 2 which follows.

Figure 2:
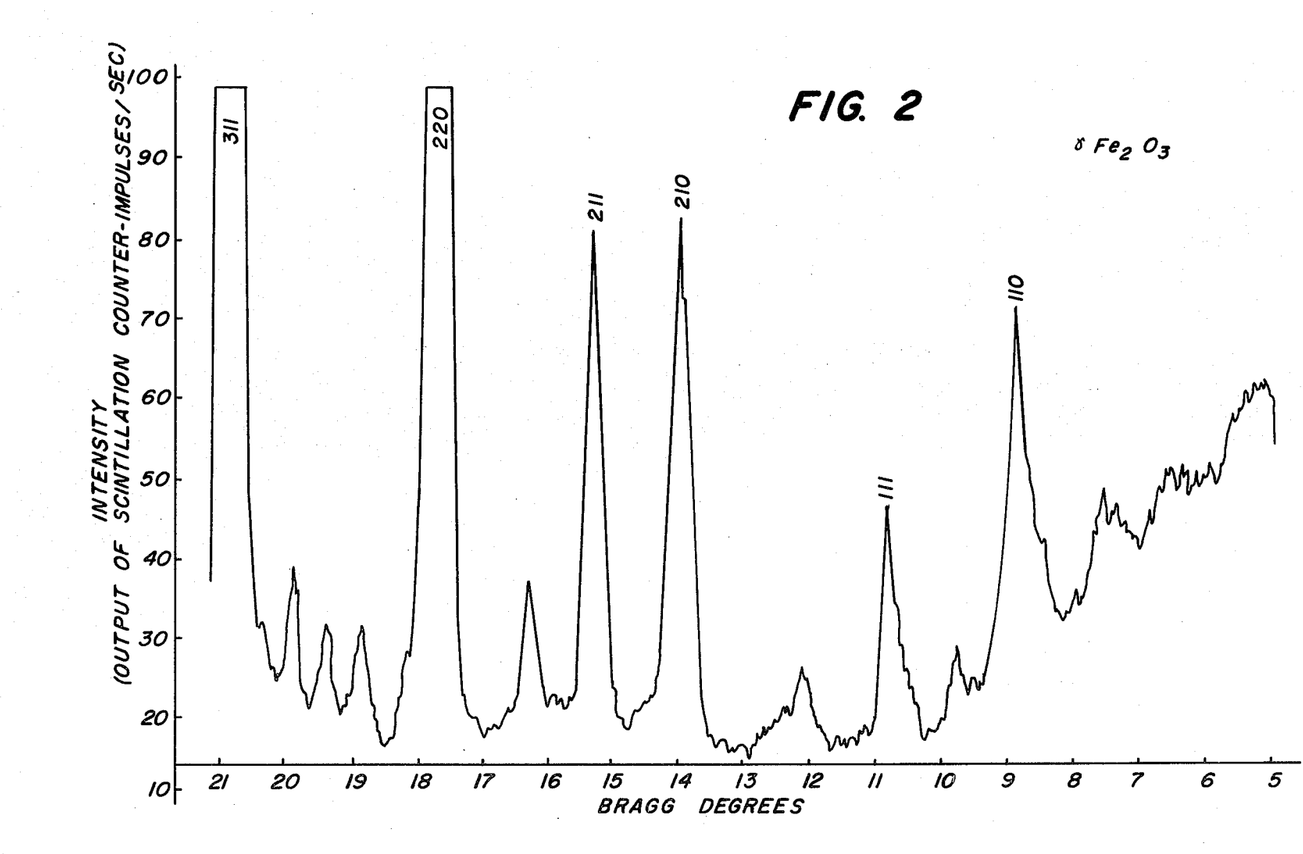

By comparing the spectrograms of acicular gamma ferric oxide (FIG. 2) and acicular ferrous ferric oxide (FIG. 1) it can be seen that the triplet lines 110, 210 and 211 are indicative of the vacancies of the lattice of the gamma ferric oxide. When these vacancies are filled up with iron (or cobalt), the lattice of the ferrous ferric oxide is obtained. When gamma ferric oxide is doped with cobalt in the absence of dicarboxylic acid (FIG. 3), there is a reduction in the intensities of the lines of the triplet. This reduction corresponds to the filling up of the vacancies of the lattice by the cobalt ions. When gamma ferric oxide is prepared according to the invention, i.e. if a water soluble dicarboxylic acid or its precursor is introduced prior to oxidation of the ferrous hydroxide to the ferric oxide hydrate, it is found that the intensity of the lines (FIG. 4) increases again, which shows that the number of vacancies has increased. Since in bulk there is as much cobalt present, it must be localized in some other part of the crystal, i.e. in the substitution sites. Accordingly, it can be seen that the water soluble, dicarboxylic acid alters or modifies the distribution of the cobalt doping ions, i.e. the distribution of the doping metal ions in the crystal lattice is directed by the water soluble acyclic dicarboxylic acid. The increase of the intensities of the triplet lines 110, 210 and 211 with respect to the intensity of the 111 line is characteristic of an improvement in the print-through of the cobalt doped, acicular gamma ferric oxide crystals.

In practicing this invention, the distribution of doping metal ions normally obtained in doped, acicular gamma ferric oxide crystals is altered, changed or modified by the introduction of a water soluble, acyclic dicarboxylic acid or its precursor during the preparation of these crystals. Suitable precursors of the dicarboxylic acids are functional equivalents of the acids and include such derivatives as amine salts, eg. ammonia or substituted amines such as trimethyl, triethyl and dimethyl amines, metal salts, eg. alkali metal salts, halide derivatives, eg. acid halides, anhydrides and like materials that function or act like the free acid under the conditions of reaction. Where reference is made herein to the acids, it should be understood that such suitable precursors are also intended. The water soluble acyclic dicarboxylic acids that can be employed in the practice of this invention are soluble in water in a concentration of at least 25 grams per liter at 20° C. The acids and their functional derivatives are generally employed in concentrations of about 0.5 to 20 percent, by weight, based on ferrous hydroxide. Typical concentrations are about 2 to 10 percent, by weight, preferably about 2 to 5 percent, by weight, based on ferrous hydroxide. The acids are acyclic, i.e., they are not aromatic although they may contain aromatic substituents. Suitable acids can be saturated or unsaturated, straight or branch chain dicarboxylic acids and can contain such substituents as halogen atoms, alkyl or aryl groups on the main chain joining the two carboxylic acid groups. A preferred class of dicarboxylic acids which can be employed in the practice of this invention contains 2–7 carbon atoms. Such acids are generally straight chain unsubstituted dicarboxylic acids. Typical examples of the dicarboxylic acids or precursors that can be employed in the practice of this invention are oxalic, malonic, succinic, glutaric, adipic, pimelic, maleic, furmaric and malic acids, amine salts, metal salts and chlorides of these acids as well as corresponding anhydrides.

In practicing the process of this invention, the ferrous oxide hydrate crystals are prepared by forming an aqueous dispersion of ferrous hydroxide particles by adding an aqueous solution of ferrous salt having a pH up to about 5.5, to an aqueous solution of a stoichiometric excess of an alkaline hydroxide, in the presence of cobalt doping ions, while substantially avoiding local excesses of the ferrous salt and then introducing oxygen into the dispersion at a temperature below 60° C. for a period of time sufficient to convert the ferrous hydroxide particles to ferric oxide hydrate crystals.

The ferrous hydroxide particles are prepared by dispersing an aqueous solution of a ferrous salt in an aqueous alkaline solution, generally under non-oxidizing conditions. An alkaline solution is a solution of a compound which will react with the ferrous salt to precipitate ferrous hydroxide, for example an alkaline hydroxide of one of the alkali metals such as sodium or potassium. The non-oxidizing conditions that are employed are such that there is essentially no ferric hydroxide contaminant in the precipitated ferrous hydroxide dispersion and that subsequent oxidation of ferrous to ferric does not begin until desired. Oxygen should be excluded from contact with the reacting solutions to such an extent that at the end of the precipitation of the ferrous hydroxide the ferric ion content in the dispersion is less than 1 percent, by weight, of the ferrous ion content, as ascertained by potensiometric measurements and analysis.

Introduction of the ferrous salt solution can conveniently be accomplished by a device which makes it possible to violently disperse and intermix the ferrous salt rapidly while the liquid-air interface is maintained sufficiently calm that an undesirable amount of air is not introduced into the solution from the ambient atmosphere, which avoids any localized imbalance of reagent concentrations and which can also be used for the subsequent introduction of oxygen, for example, as pure oxygen or as air into the dispersion. There are many ways of conducting such a controlled reaction, but a particularly suitable way involves using the device described in Audran U.S. Pat. No. 2,996,286 issued Aug. 15, 1961. This device, which can be called a "rotatory saucer," comprises two coaxial cones, opposed at their bases and very close to each other, carried on a hollow shaft, with openings which enable communication between the interior of the shaft and the immersing liquid volume between the two opposed cones, and thence through the open area on the periphery located between the two cones. The shaft is connected to a motor device which imparts to the shaft and to the cones a rotary movement (a rotational speed of about 2800 rpm for cones of about 8-inch diameter is suggested as a starting point from which an optimum value can be ascertained). This assures a centrifugal effect on the fluids that are in contact with the walls of the cones. Suitable valves permit adding liquids or introducing air and other gases through the hollow shaft. First the solution of ferrous salt is admitted to the hollow shaft, and thereupon the liquid particles escaping from this shaft and from between the cones in this area can be rapidly and widely dispersed in the liquid mass wherein the cones turn.

After rapid dispersion of the solution of ferrous salt into the alkaline solution, the precipitated ferrous hydroxide is oxidized so that the nucleation and growth of the crystalline nuclei proceed with great uniformity. In order to assure a constant speed to this reaction, air is admitted to the hollow shaft, whence it is sucked into and dispersed in the suspension by means of the rotation of the shaft and more especially of the attached saucer. The air must be admitted in progressively increasing volumes because the thickening of the suspension makes the solid-gas exchange and the diffusion of the oxygen progressively less efficient. When oxidation is completed, the dispersion or suspension is brought to boiling and boiled for a short time, such as one half hour or one hour, in order to complete and perfect the crystallization of $\alpha$ ferric oxide hydrate. Then the dispersion is filtered and the crystals of $\alpha$ ferric oxide hydrate are washed and dried. Of course, if other techniques for achieving intermixing are employed, an oxygen-free atmosphere above the reactants can be assured by maintaining a blanket of inert gas such as nitrogen or argon over the surface of the reactants so that premature oxidation does not occur.

The conditions for precipitation and oxidation of the ferrous hydroxide depend on various factors, such as the concentration of the ferrous solution, the excess of the alkaline solution, the duration of the precipitation and of the oxidation, as well as the reaction temperature. The concentration and quantity of the starting ferrous solution is such that the $\alpha$ ferric oxide hydrate content of the oxidized dispersion generally does not exceed about 45 grams per liter, often about 10 to 20 grams per liter.

The excess of the alkaline hydroxide in solution that is used with respect to the necessary stoichiometric quantity to precipitate all of the ferrous salt as ferrous hydroxide can be any suitable excess such as an excess of about 200 to 600 percent. but it is desirably about 500 percent or more at the end of the reaction. The concentration of the dissolved alkaline compound does not remain the same during the precipitation of the ferrous hydroxide and during its oxidation since it is advantageous to dilute the slurry before beginning the oxidation. This fact should be kept in mind when choosing a suitable concentration of alkaline hydroxide to use in the precipitation of ferrous hydroxide. In one embodiment of this invention, the ferrous hydroxide compound is precipitated in an alkaline solution containing at least 250 grams per liter of alkaline compound, then readjusted to a concentration that will provide, for example, about 15 grams per liter of the finally-produced ferric oxide hydrate by adding water after all of the ferrous hydroxide is precipitated.

In practicing the process of this invention, the alkaline solution employed to precipitate the ferrous salt as ferrous hydroxide can be a hydroxide of any of the alkali metals chosen from Group IA of the Periodic Table, for example caustic soda or caustic potash. The ferrous salt used can be any salt or hydrate thereof that is sufficiently soluble to make the starting solution and which will not complex the ferrous hydroxide. Ferrous chloride having 4 molecules of water, ferrous nitrate, or ferrous sulfate having 7 molecules of water are common examples of such salts.

The precipitation of ferrous hydroxide is generally accomplished quite rapidly, advantageously in less than about 10 minutes. Generally the dispersion of ferrous hydroxide is stirred for a period of time, eg. 30 minutes, after the end of the introduction of ferrous salt and before oxidation begins to insure that all of the ferrous salt is precipitated in the form of ferrous hydroxide.

The time required to complete the oxidation of ferrous hydroxide is dependent on several factors, including the rate at which oxygen, generally as air, is introduced into the suspension, the temperature, the alkaline hydroxide excess and the concentration of the ferrous hydroxide in the dispersion. Oxidation can generally be started about 30 minutes after terminating the inflow of the ferrous solution so that all the ferrous hydroxide is precipitated and comes to equilibrium in the suspension. In order to obtain homogeneous crystals of $\alpha$ ferric oxide hydrate the growth of the crystalline nuclei must progress smoothly, which requires control of the oxidation rate. The oxidation rate is adjusted as a function of the kinetic growth of the $\alpha$ ferric oxide hydrate crystals which requires that the flow rate of the oxidizing agent be adjusted during the course of the oxidation. Generally this flow rate is increased during the oxidation. The duration of the oxidation is subject to variation but it generally does not exceed about 6 hours. When oxidation is complete the dispersion of $\alpha$-ferric oxide hydrate is brought to boiling for a short time, eg., 30 minutes to one hour, in order to complete and perfect the crystallization of the $\alpha$ ferric oxide hydrate crystals. Thus the dispersion is generally cooled, filtered, washed with water and dried.

The length of the acicular $\alpha$ ferric-oxide hydrate grows when the duration of precipitation and of oxidation increase, other conditions of reaction, particularly the concentration of such crystals in the final dispersion, being the same. It should be noted, however, that the concentration of acicular $\alpha$ ferric oxide hydrate in the final dispersion has an influence on the length and on the acicularity ratio of the particles.

Depending upon the conditions of preparation, the acicular $\alpha$ ferric-oxide hydrate crystals have a length of about $0.3\mu$ to about $0.5\mu$ up to about $1.5\mu$. For example, at concentrations of $\alpha$ ferric oxide hydrate in the final dispersion of about 10 g/l, and for durations of oxidation not exceeding 2 hours, the acicular crystals have a length which generally does not exceed $0.5\mu$, eg. acicular crystals the length of which is about $0.3\mu$ to $0.5\mu$. For concentrations of ferric oxide hydrate of approximately 25 g/l and for durations of oxidation of about 4 to 5 hours, the acicular particles obtained have a length of about $0.8\mu$ to $1\mu$.

The temperature during precipitation and oxidation is generally kept lower than 60° C. When the temperature increases, the length of the crystals is not changed significantly, but the diameter increases and the acicularity ratio decreases correspondingly. At still higher temperatures, cubic ferric oxide crystals are formed directly with the length of the cube edge being about the length of the acicular particles that would have formed at lower temperatures.

As pointed out previously, the water soluble acyclic dicarboxylic acid or its precursor is added to the reaction prior to the oxidation of the ferrous hydroxide to α ferric oxide hydrate. Advantageously the diacid or its precursor is added to the ferrous solution before the precipitation of the ferrous hydroxide. This ferrous salt solution generally has a pH up to about 5.5 preferably in the range of about 2 to 5. If a diacid precursor such as the alkali metal salt is added to the ferrous solution, the pH of the solution should not be permitted to exceed about 5.5. If this pH is exceeded, a few drops of mineral acid can be added to restore the proper pH. After completion of the oxidation, the α ferric oxide hydrate crystals are subjected to dehydration, reduction and oxidation to form gamma ferric oxide crystals as is known in the prior art. As is obvious to those skilled in the art, γ ferric oxide crystals retain the general appearance and the dimensions of the α ferric oxide hydrate crystals used to form them. Suitable temperature ranges for the aforementioned treatments are respectively, about 200° to 350° C., about 300° to 450° C., and about 300° to 500° C.

The cobalt doping metal ions can be introduced into the gamma ferric oxide crystals by carrying out the precipitation of ferrous hydroxide in the presence of the cobalt ions. These ions can be introduced by dissolving suitable water soluble cobalt compounds, for example, sulfates or nitrates, in the initial ferrous salt solution in appropriate quantities. In practicing this invention, the acicular gamma ferric oxides can be doped with mixtures of doping metal ions as long as one of the metals is cobalt. Other doping metal ions that can be used in combination with cobalt include, for example ions of the polyvalent metals such as cobalt, nickel, zinc, manganese, chromium or the like. The concentration of cobalt ion employed is subject to variation, depending on such things as size of the magnetic particles. However, dopant levels in the range of about 1 to about 6 percent, by weight, based on oxide, often about 1 to 3 percent, are particularly suitable. If other dopant metal ions are employed with cobalt they are generally employed in comparable concentrations, for example, concentrations in the range of about 0.1 to about 5 percent, by weight, often about 0.25 to about 2 percent. Like the cobalt doping ions, the ions of the other dopants can be added to the ferrous salt solution in the form of a water soluble salt, for example, a nitrate or sulfate. Calcium ions are particularly useful to improve the thermal stability of the cobalt doped, acicular γ ferric oxide crystals of this invention. Such ions can be used in concentrations of about 0.5 to 2 percent, by weight, based on oxide, and are conveniently introduced into the γ ferric oxide crystals by washing α ferric oxide hydrate crystals with wash water containing the calcium ions and then converting such washed crystals to γ ferric oxide by dehydration, reduction and oxidation. The cobalt doped, acicular gamma ferric oxide crystals prepared according to this invention generally have an acicularity ratio above about 3 to 5 and preferably acicularity ratios that are 15 or more, for example acicularity ratios in the range of about 20 to 40. The particle sizes of these acicular gamma ferric oxide crystals are generally quite small with their major axes being up to about 1.5 microns. The coercivity ($H_c$) of the particles is subject to wide variation, but is preferably at least 450 Oe and often in the range of about 450 to 1200 or 2000 Oe.

The cobalt doped acicular gamma ferric oxide crystals described herein can be employed in magnetic recording layers applied to a wide variety of non-magnetizable supports, including discs, belts, paper or film and the like. Such oxides can be used in audio, video and instrumentation (physical data) recording tapes. Suitable supports can be subbed by known methods, are generally flexible and typically include such materials as cellulose nitrate film, cellulose acetate film, polyvinyl acetal film, polystyrene film, polyesters such as poly(ethylene terephthalate) film which can be biaxially or asymmetrically stretched, polycarbonate film and related films or resinous materials as well as papers, metals such as aluminum or brass, and the like. The thickness of the support is subject to variation; however, such supports generally have a thickness in the range of about 4 to about 300 microns, often in the range of about 6 to about 38 microns, and preferably in the range of about 12 to about 25 microns. As far as practical, the support surface coated with the magnetic recording dispersions should be as smooth as possible.

The binders that can be used to disperse the cobalt doped acicular gamma ferric oxide crystals in magnetic recording layers according to the practice of this invention include any of the binders well known for the manufacture of magnetic recording layers. Typical binders are polymeric binding agents such as copolymers of vinyl acetate with vinyl chloride, copolymers of vinylidene chloride with acrylonitrile, copolymers of acrylic and/or methacrylic esters, polyvinylbutryal copolymers of butadiene with styrene, terpolymers of acrylonitrile, vinylidene chloride and maleic anhydride, crosslinked or non-crosslinked, homopolymers or copolymers such as polyamide, polyurethanes, polyesters and the like as well as mixtures of these binders. Very good results can be obtained with a copolymer of vinyl acetate with vinyl chloride, partially hydrolyzed and possibly crosslinked with an isocyanate or any of the many similar reactive constituents, or by using polyurethanes or polyesters or a mixture of these binders. The amount of binder employed with respect to the doped gamma ferric oxide crystals in a magnetic recording element of this invention is generally in the range of about 10 percent to about 40 percent, by weight, and preferably from about 15 percent to about 25 percent, by weight.

Suitable solvents that can be employed in the preparation of magnetic dispersions in the practice of this invention include organic materials such as methyl ethyl ketone, methylisobutyl ketone, ethyl acetate, butyl acetate, cyclohexanone, butyl alcohol, methylene chloride, and the like as well as mixtures thereof. The magnetic recording layers can contain other additives such as lubricants and the like as would be obvious to those skilled in the art.

As previously indicated herein, print-through is the signal induced in a magnetic layer of a magnetic recording element by the field of a signal recorded in another layer. For convenience, in the following Examples, the print-through was measured and reported as a signal to print-through ratio rather than as induced signal. This is a conventional method for measuring print-through. The signal to print-through ratio is the difference between the amplitude of the recorded signal and that of the signal transferred to the immediately adjacent convolution of a tape. The method used was as follows:

the tape samples were demagnetized, then recorded at a wavelength of 190 microns.

The recording current was adjusted so that the bias corresponded to the maximum sensitivity of the low frequency signal having a wavelength of 190 microns and the signal level was chosen to be that having about 3% harmonic distortion.

Recording was carried out on a ¼ inch Revox A 77 magnetic recorder fitted with 2 track heads. The tape speed was 19 cm/sec. (7.5 ips). Recording was made at each tenth rotation of the take-up reel during ¾ of a rotation. To be compatible with the measuring paper that was recorded, identified hereinafter, a take-up reel with a hub having a diameter of at least 20 cm was used. The recorded tapes were stored for 24 hours at room temperature before being evaluated.

The signal to print-through ratio, i.e. the difference between the amplitude of the recorded signal and that of the signal transferred to the adjacent convolution, was measured on the same equipment described hereinbefore. For obtaining a more accurate measurement, the playback output signal was put through a 50 db attenuator which was active only during the passage of the recorded signal (¾ rotation). The tape was then put through a filter centered on the frequency of the recorded signal so as to obtain a signal to noise ratio sufficient for reading the print-through signal. Finally, the information was recorded on a Bruel and Kjaer strip chart recorder model 2305.

The invention is further illustrated by the following examples of its practice:

EXAMPLE 1

Run A 3.5 liters of demineralized water and 500 g. of sodium hydroxide were placed in a 10 liter vessel. After complete dissolution, the temperature was lowered and stabilized at 40° C. Using the motor driven hollow shaft and the dispersing saucer of Audran U.S. Pat. No. 2,996,287, issued Aug. 15, 1961 and described hereinbefore, one liter of a solution containing 200 g. of ferrous sulfate ($FeSO_4.7H_2O$) and 10 g. of cobaltous sulfate ($CoSO_4.7H_2O$) was flowed into the sodium hydroxide solution in 11 minutes. 2.5 Liters of demineralized water were added after the entire ferrous salt solution had been introduced. The solution in the reaction vessel was maintained at 40° C. throughout the reaction. Forty minutes after the end of the precipitation, compressed air was blown progressively into the suspension at a flow rate in the range of from 5 liters/hour to 20 liters/hour using the aforementioned stirring device.

After 2 hours and 40 minutes of oxidation the reaction was complete. The temperature of the aqueous dispersion was then raised to the boiling point for about 30 minutes and the dispersion was filtered, washed with demineralized water and the resulting cobalt doped, α ferric oxide hydrate was dried. The size of the particles was from 0.4 micron to 0.5 micron with an acicularity ratio of 20 to 25.

After conventional heat treatment of the resulting ferric oxide hydrate (α-FeOOH) needles, ie., dehydration to alpha ferric oxide at a temperature of about 270° C., reduction into ferrous ferric oxide ($Fe_3O_4$) at 350° C. and controlled oxidation, a cobalt doped, gamma ferric oxide was obtained. This cobalt doped gamma ferric oxide also had a particle size of 0.4 to 0.5 micron and an acicularity ratio of 20 to 25, and a coercivity ($H_c$) of about 770 Oe.

Run B

Run A was repeated except that 2.1 g per liter of malonic acid (3 percent, by weight, with respect to ferrous hydroxide) was added to the solution of ferrous and cobaltous salts.

The gamma ferric oxides obtained in Runs A and B had substantially the same particle sizes, acicularity ratios and coercivity and were dispersed in a binder of poly(vinyl acetate-vinyl chloride), partially hydrolyzed, (Rhodopas AXRH, commercially available from Rhone-Poulenc). The resulting dispersions were coated on 23 microns thick polyester base. After coating and evaporation of the solvent, the layers were calendered and had a final thickness of 5 microns.

The signal to print-through ratio (referred to more simply, as print-through) was measured for these two tapes as described hereinbefore. The value of the print-through for the tape obtained with the oxide of Run A (control tape) was 58 dB, whereas the tape made with the oxide of Run B gave a print-through value of 63 dB, a gain of 5 dB. The signal output level was measured and found to be substantially the same for each tape. Also, as shown by X-ray diffraction analysis as described hereinbefore, the use of malonic acid in Run B changes the distribution of cobalt ions so that the ratios between each of the triplet lines 110, 210 and 211 with respect to the 111 line increases at least 5 percent.

EXAMPLE 2

Run B of Example 1 was repeated except that malonic acid was replaced by 2.1 g succinic acid (3 percent, by weight, with respect to ferrous hydroxide). A similar improvement in print-through was obtained, i.e. 63 dB as compared to 58 dB for the control tape of Run A of Example 1. Likewise, it was noted that the signal output level was substantially the same for the tape obtained by the procedure of this Example and Run A.

Figure 3:
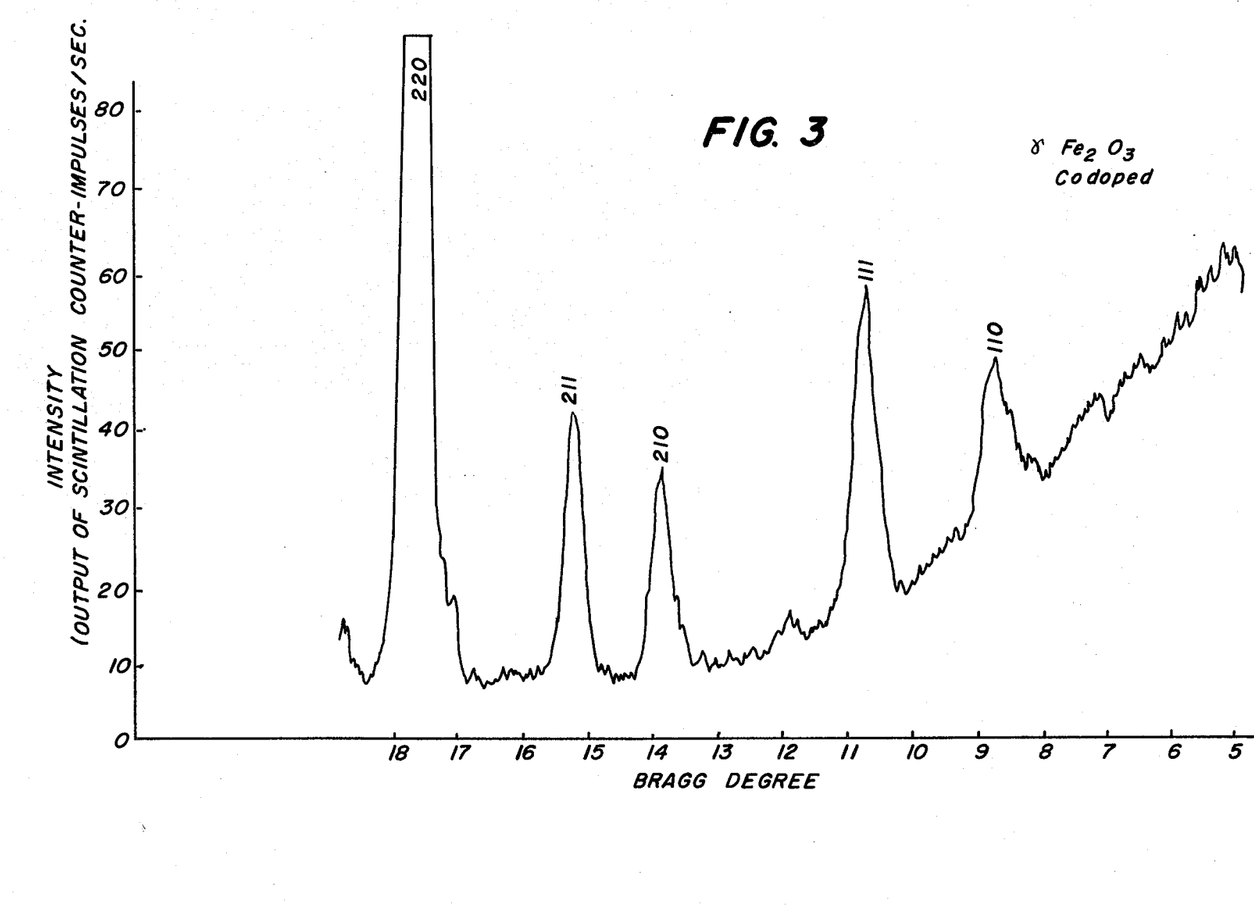
Figure 4:
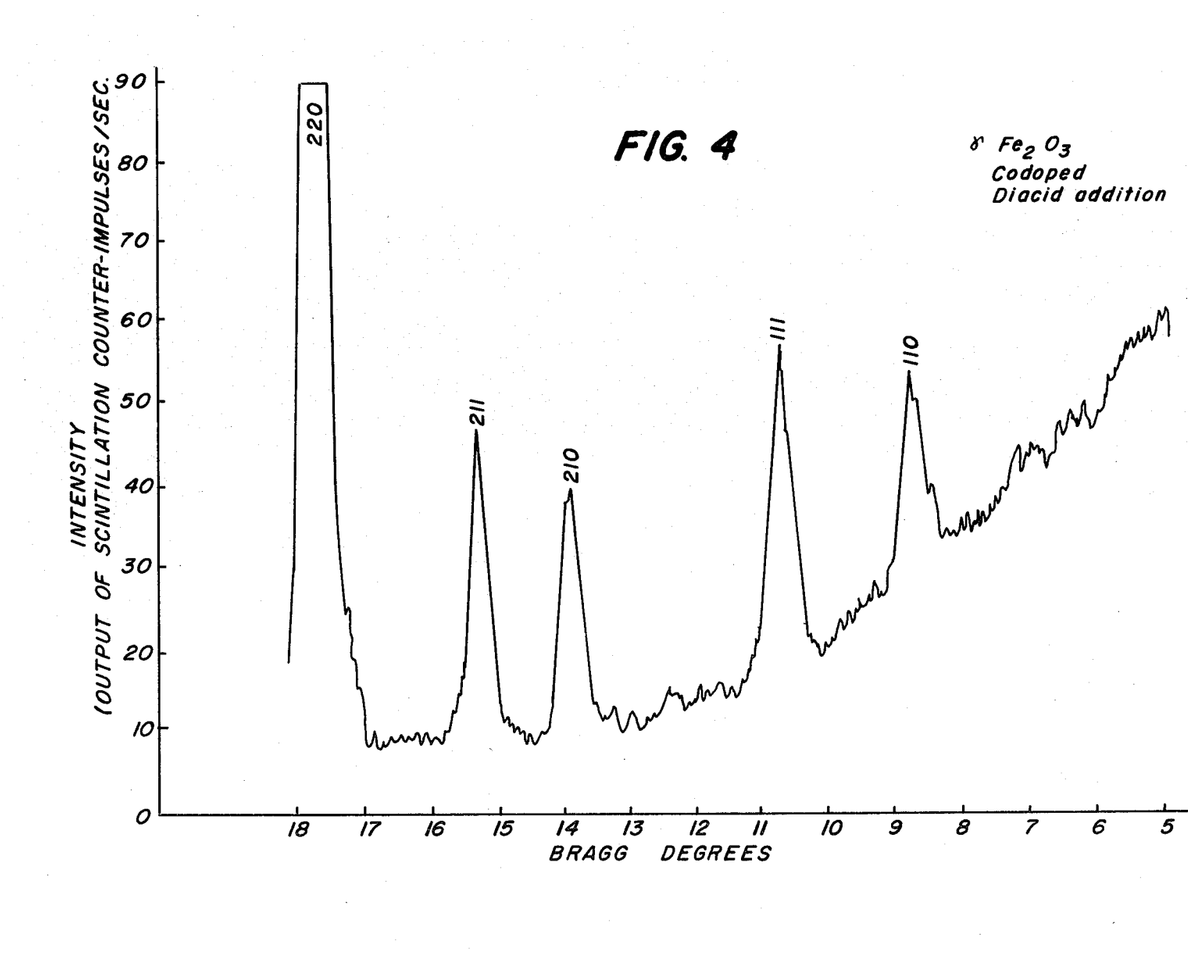

It can be seen from FIGS. 3 and 4 of the drawings that the oxide treated with succinic acid has triplet lines 110, 210 and 211 whose intensities, as compared to the intensity of the 111 line, are substantially increased with respect to those of the tape prepared from the oxide of Run A. The following table gives the values of the ratios $I/I_{111}$ of these three lines for the oxide treated with succinic acid and for the untreated material.

TABLE

|  | $\dfrac{I_{110}}{I_{111}}$ | $\dfrac{I_{210}}{I_{111}}$ | $\dfrac{I_{211}}{I_{111}}$ |
| --- | --- | --- | --- |
| Run A (without) succinnic acid) | 0.47 | 0.65 | 0.8 |
| Run B (with succinnic acid) | 0.58 | 0.75 | 0.95 |
| Increase in Ratio of Intensities | 23.4% | 15.4% | 18.8% |

It can be seen that the intensity (I) increases from about 15 percent to 23 percent for the triplet lines 110, 210 and 211. As previously indicated in Example 1, a similar increase can be expected when the malonic acid treated oxide of Example 1 Run B is compared with the untreated oxide of Example 1 Run A.

EXAMPLE 3

The procedure of Example 1 Run B was repeated, except that 2.1 g of maleic acid was introduced into the ferrous salt solution. The corresponding magnetic tape exhibited a print-through value of 63 dB, i.e., an improvement of 5 dB with respect to the control tape of Run A. The increase in intensities for the triplet lines 110, 210 and 211 with respect to the 111 line for the maleic acid treated oxide were comparable to those of the succinic acid treated material of Example 2.

EXAMPLE 4

Hydroxy-substituted acids, although not preferred in practicing this invention, do accomplish some improvement in print-through. To illustrate, the procedure of Run B of Example 1 was repeated using 2.1 g of malic acid instead of malonic acid. The corresponding magnetic tape had a print-through of 59.5 dB, i.e. an increase of 1.5 dB over that of the control tape.

EXAMPLE 5

The procedure of Run B of Example 2 was repeated, except that 0.7 g of succinic acid was added (1 percent, by weight, with respect to ferrous hydroxide) instead of 2.1 g. The print-through value of 61.5 dB was obtained on the tape prepared from the oxide. This was an improvement of 3.5 dB with respect to that of the control tape of Run A, Example 1.

EXAMPLE 6

The procedure of Run B for Example 2 was repeated, except that 7 g of succinic acid (10 percent, by weight, with respect to ferrous hydroxide) were added instead of 2.1 g. The resulting tape prepared in Example 1 had a print-through value of 63.5 dB, i.e., a gain of 5.5 dB with respect to the control tape.

EXAMPLE 7

Suitable diacid precursors that can be used in the practice of this invention are alkali metal salts of the acids. To illustrate, the procedure of Run B, Example 2 was repeated except that the 2.1 g of succinic acid was replaced with an equimolecular quantity of sodium succinate. The corresponding magnetic tape exhibited a print-through which was comparable to that obtained with the succinic acid treated oxide of Run B, Example 2.

When the concentration of cobalt is different from the 3 percent as in the previous Examples, for example 1 or 6 percent, one can expect to obtain results with respect to print-through that are very similar to those of the preceding Examples.

EXAMPLE 8

The dicarboxylic acid is added prior to the oxidation of the ferrous hydroxide in practicing this invention. Its addition at a later stage is not effective to reduce print-through. To illustrate, the procedure of Run B of Example 2 was repeated, except that succinic acid was added one hour after the beginning of the oxidation of ferrous hydroxide to alpha ferric oxide hydrate. When the value of the print-through was measured on the tape prepared from the corresponding gamma ferric oxide, a value of only 57 dB was obtained, i.e., no improvement with respect to the control tape of Run A, Example 1.

EXAMPLE 9

As previously indicated, aromatic acids are ineffective in the practice of this invention. To illustrate, the procedure of Run B of Example 1 was repeated using 2.1 g of ortho-phthalic acid instead of malonic acid. The corresponding magnetic tape had a print-through of only 57 to 58 dB, i.e., equal to that of the control tape.

What is claimed is:

1. A process for preparing cobalt doped, acicular, gamma ferric oxide crystals that exhibit improved print-through without substantial loss in signal output or recording sensitivity which process comprises:
    (1) forming an aqueous dispersion of ferrous hydroxide particles by adding an aqueous solution of ferrous salt having a pH up to about 5.5 to an aqueous solution of a stoichiometric excess of an alkaline hydroxide, in the presence of cobalt doping ions, while substantially avoiding local excesses of said ferrous salt,
    (2) introducing oxygen into said dispersion at a temperature below 60° C. for a period of time sufficient to convert said ferrous hydroxide particles to ferric oxide hydrate crystals, and,
    (3) subjecting said crystals to dehydration, reduction and oxidation to form cobalt doped, acicular, gamma ferric oxide, said process being characterized by the addition of about 0.5 to 20 percent, by weight, based on ferrous hydroxide, of a water soluble acyclic dicarboxylic acid or its precursor prior to said introduction of oxygen.

2. A process according to claim 1 in which said dicarboxylic acid is added at a concentration in the range of from about 2 to 10 percent, by weight.

3. A process according to claim 1 in which said dicarboxylic acid is a straight chain, saturated acid containing from 2 to 7 carbon atoms.

4. A process according to claim 3 in which said dicarboxylic acid is oxalic, malonic, succinic or glutaric acid.

5. A process according to claim 1 in which said dicarboxylic acid is an unsaturated acid.

6. A process according to claim 1 in which said dicarboxylic acid is a substituted dicarboxylic acid containing a halogen, alkyl or aryl group.

7. A process according to claim 1 in which doping metal ions of nickel, chromium, manganese or zinc are present during the formation of said dispersion of ferrous hydroxide particles.

8. A product for magnetic recording comprising a support coated with a magnetic recording layer containing cobalt doped, acicular, gamma ferric oxide prepared according to the process of claim 7.

9. A process according to claim 1 in which said pH is in the range about 2 to 5.

10. Cobalt doped, acicular, gamma ferric oxide crystals that exhibit improved print-through without substantial loss in signal output or recording sensitivity, said crystals being formed according to the process of claim 1 by cobalt doping in the presence of a water soluble, acyclic, dicarboxylic acid which directs cobalt ions into substitution sites within the crystal lattices, said crystals exhibiting an increase of at least 5 percent in the ratios between the intensities of each of the triplet lines 110, 210, 211, with respect to the 111 line, as determined by X-ray diffraction, in comparison to corresponding crystals prepared according to the process of claim 3 but, in the absence of said acid.

11. Cobalt doped, acicular, gamma, ferric oxide according to claim 10 which exhibits an increase of about 15 l to 25 percent in said ratios.

12. A product for magnetic recording comprising a support coated with a magnetic recording layer containing cobalt doped, acicular, gamma ferric oxide of claim 10.

* * * * *

UNITED STATES PATENT AND TRADEMARK OFFICE
CERTIFICATE OF CORRECTION

PATENT NO. : 4,178,416

DATED : December 11, 1979

INVENTOR(S) : Jean-Marie H. Hector, Bernard J. Pingaud

It is certified that error appears in the above-identified patent and that said Letters Patent are hereby corrected as shown below:

Column 2, lines 29-30, "drystals" should read -- crystals --.

Column 3, line 11, after "cobalt" insert -- in cobalt --.

Column 8, line 39, "Thus" should read -- Then --.

Column 9, line 56, after "washing" insert -- the --.

In The Claims

Column 14, line 60, delete "3" and insert -- 1 --.

Column 14, line 63, delete "1" after the number 15.

Signed and Sealed this

Twenty-eighth Day of April 1981

[SEAL]

Attest:

RENE D. TEGTMEYER

Attesting Officer

Acting Commissioner of Patents and Trademarks